(12) United States Patent
Ghosh et al.

(10) Patent No.: US 8,086,645 B2
(45) Date of Patent: Dec. 27, 2011

(54) COMPILATION AND PROCESSING A PARALLEL SINGLE CURSOR MODEL

(75) Inventors: Bhaskar Ghosh, Burlingame, CA (US);
Thierry Cruanes, Redwood City, CA (US); Benoit Dageville, Foster City, CA (US); Rushan Chen, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2020 days.

(21) Appl. No.: 10/824,887

(22) Filed: Apr. 13, 2004

(65) Prior Publication Data

US 2005/0132383 A1 Jun. 16, 2005

Related U.S. Application Data

(60) Provisional application No. 60/530,413, filed on Dec. 16, 2003.

(51) Int. Cl.
*G06F 7/00* (2006.01)

(52) U.S. Cl. .......................................... 707/803; 719/312

(58) Field of Classification Search .......................... None
See application file for complete search history.

(56) References Cited

U.S. PATENT DOCUMENTS

| | | | |
|---|---|---|---|
| 4,769,772 A | 9/1988 | Dwyer | |
| 4,860,201 A | 8/1989 | Stolfo et al. | 364/200 |
| 5,325,525 A | 6/1994 | Shan et al. | 718/104 |
| 5,495,606 A * | 2/1996 | Borden et al. | 707/3 |
| 5,765,146 A | 6/1998 | Wolf et al. | 707/2 |
| 5,822,750 A | 10/1998 | Jou et al. | |
| 5,835,755 A | 11/1998 | Stellwagen, Jr. | 707/3 |
| 5,857,180 A * | 1/1999 | Hallmark et al. | 707/2 |
| 5,864,839 A | 1/1999 | Bourgoin | |
| 5,937,401 A | 8/1999 | Hillegas | |
| 6,081,801 A | 6/2000 | Cochrane et al. | 707/3 |
| 6,085,189 A | 7/2000 | Pirahesh et al. | 707/3 |
| 6,112,198 A * | 8/2000 | Lohman et al. | 707/3 |
| 6,289,334 B1 * | 9/2001 | Reiner et al. | 707/3 |
| 6,411,951 B1 | 6/2002 | Galindo-Legaria et al. | |
| 6,430,550 B1 | 8/2002 | Leo et al. | |
| 6,466,931 B1 | 10/2002 | Attaluri et al. | 707/2 |
| 6,529,901 B1 | 3/2003 | Chaudhuri et al. | 707/3 |
| 6,601,064 B1 | 7/2003 | Nag et al. | |
| 6,625,593 B1 | 9/2003 | Leung et al. | 707/2 |
| 6,721,724 B1 | 4/2004 | Galindo-Legaria et al. | 707/2 |
| 6,910,032 B2 * | 6/2005 | Carlson et al. | 707/3 |
| 6,928,451 B2 | 8/2005 | Mogi et al. | 707/102 |
| 6,954,776 B1 * | 10/2005 | Cruanes et al. | 709/201 |
| 6,968,335 B2 | 11/2005 | Bayliss et al. | 707/10 |
| 7,020,661 B1 * | 3/2006 | Cruanes et al. | 707/103 R |
| 7,051,034 B1 | 5/2006 | Ghosh et al. | 707/100 |

(Continued)

OTHER PUBLICATIONS

Dayco related U.S. Appl. No. 10/865,178, filed on Jun. 9, 2004.

(Continued)

*Primary Examiner* — Shyue Jiunn Hwa
(74) *Attorney, Agent, or Firm* — Hickman Palermo Truong & Becker LLP (57) ABSTRACT

Techniques are provided for executing query statements, or portions thereof, in parallel without using slave SQL to communicate to each slave the operations to be performed by the slave. Instead of generating one cursor for the query coordinator (QC) based on the original statement, and separate cursors for each DFO based on the slave SQL, the techniques involve sharing the cursor that is generated from the original statement among the various participants involved in the parallel execution of the operations specified in the original statement.

28 Claims, 3 Drawing Sheets

U.S. PATENT DOCUMENTS

| | | | |
|---|---|---|---|
| 7,089,356 B1* | 8/2006 | Chen et al. | 711/113 |
| 2002/0038300 A1 | 3/2002 | Iwata et al. | 707/5 |
| 2003/0055813 A1 | 3/2003 | Chaudhuri et al. | 707/3 |
| 2003/0065644 A1* | 4/2003 | Horman et al. | 707/1 |
| 2003/0187831 A1 | 10/2003 | Bestgen et al. | |
| 2003/0208489 A1 | 11/2003 | Todd | |
| 2003/0229640 A1* | 12/2003 | Carlson et al. | 707/100 |
| 2004/0172626 A1* | 9/2004 | Jalan et al. | 717/149 |
| 2004/0268227 A1* | 12/2004 | Brid | 715/504 |
| 2005/0049996 A1 | 3/2005 | Srinivasan et al. | 707/1 |
| 2005/0131890 A1* | 6/2005 | Cruanes et al. | 707/4 |
| 2005/0132383 A1* | 6/2005 | Ghosh et al. | 719/312 |

OTHER PUBLICATIONS

Dayco related U.S. Appl. No. 10/841,991, filed on May 6, 2004.
Office Action dated Apr. 23, 2008 for U.S. Appl. No. 11/202,453, filed Aug. 11, 2005.
Notice of Allowance dated Jul. 22, 2008 for U.S. Appl. No. 10/930,433, filed Aug. 30, 2004.
Examiner's Answer dated Sep. 3, 2008 for U.S. Appl. No. 10/841,991, filed May 6, 2004.
Advisory Action dated Mar. 11, 2009 for U.S. Appl. No. 10/944,175, filed Sep. 16, 2004.
Office Action dated Jan. 5, 2009 for U.S. Appl. No. 10/944,175, filed Sep. 16, 2004.

* cited by examiner

COMPILATION AND PROCESSING A PARALLEL SINGLE CURSOR MODEL

PRIORITY CLAIM/RELATED CASES

This application claims the benefit of priority from U.S. Provisional Application Ser. No. 60/530,413, entitled "Parallel Shared Cursors" filed Dec. 16, 2003, which is incorporated by reference in its entirety for all purposes as if fully set forth herein.

FIELD OF THE INVENTION

The present invention relates to managing data and, more specifically, to parallelizing operations that involve managing data.

BACKGROUND

Database applications interact with a database server by submitting to the database server commands that cause the database server to perform operations on data stored in a database. A database command that is sent from a database application to a database server contains the "original statement" of the database command.

For the database server to process the commands, the commands must conform to a database language supported by the database server. One database language supported by many database servers is known as the Structured Query Language (SQL).

When a database server receives the original statement of a database command from a database application, the database server must first determine which actions should be performed in response to the database command, and then perform those actions. The act of preparing for performance of those actions is generally referred to as "compiling" the database command, while performing those actions is generally referred to as "executing" the database command.

Various database languages, such as SQL, support special-purpose constructs referred to herein as "cursors". During the compilation of a query statement, the database server may perform a significant amount of preliminary work for the statement, such as parsing, semantic analysis, and query plan generation. A cursor stores the results of much of this preliminary work. For example, one set of information stored in a cursor includes the execution plan for performing the operations specified by the SQL statement.

One method of representing an execution plan is a row-source tree. At execution, traversal of a row-source tree from the bottom up yields a sequence of steps for performing the operation(s) specified by the SQL statement. A row-source tree is composed of row-sources. During the compilation process, row-sources are allocated, and each row-source is linked to zero, one, two, or more underlying row-sources. The makeup of a row-source tree depends on the query and the decisions made by a query optimizer during the compilation process. Typically, a row-source tree is comprised of multiple levels. The lowest level, the leaf nodes, access rows from a database or other data store. The top row-source, the root of the tree, produces, by composition, the rows of the query that the tree implements. The intermediate levels perform various transformations on rows produced by underlying row-sources.

The row-source tree representation of execution plans is described in detail in U.S. Pat. No. 5,857,180, entitled "Method and apparatus for implementing parallel operations in a database management system", issued to Hallmark et al on Jan. 5, 1999, the entire contents of which are incorporated herein. Hallmark also describes a "row-source approach" for parallelizing the operations required by an SQL command by parallelizing portions of the execution plan of the query. The row-source approach to parallelizing queries is described in greater detail below.

Parallel Execution of a Query Using Slave SQL

Sequential query execution uses one processor and one storage device at a time. In contrast, parallel query execution uses multiple processes to execute, in parallel, suboperations of a query. For example, virtually every query execution includes some form of manipulation of rows in a relation, or table of the database management system (DBMS). Before any manipulation can be done, the rows must be read, or scanned. In a sequential scan, the table is scanned using one process. Parallel query systems provide the ability to break up the scan such that more than one process can get involved in performance of the table scan.

Various techniques have been developed for parallelizing queries. Such techniques typically rely on an underlying query processing model. For example, one model (a "row-source model") for parallelizing queries is described, in U.S. Pat. No. 5,857,180, which was mentioned above. According to the row-source (iterator) model of SQL execution, data flows through the SQL operations modeled by a row-source in the form of row-vectors. Specifically, a parallel plan is built on the Query Coordinator (QC). The parallel plan is subdivided into sub-plans or sub-trees, each called a DFO (Data Flow Object), each of which are scheduled and run in parallel on a set of parallel execution slaves.

One of the main design issues in any parallel SQL execution engine is how to express and communicate these tasks or sub-plans to the parallel slave processes. According to one implementation of the row-source model, a specialized form of SQL, called slave SQL, is used to express such tasks or sub-plans. Slave SQL is standard SQL plus some extensions to support notions like data partitioning and flow of partitioned data from one DFO to another.

According to the same approach, the slave SQL, corresponding to each DFO, is sent to slaves. Upon receiving a slave SQL command, a slave compiles the slave SQL and executes the slave SQL using control information sent from the QC. The global parallel plan has a SQL cursor corresponding to each Data Flow Object (DFO). So, running a parallel query involves parsing, unparsing and executing a parallel cursor on the QC side and parsing and executing on a slave set one cursor per DFO.

When compiled by slaves, the DFO cursors expressed in slave SQL often generate special row-sources that a QC plan would never show. Given the complexity of this picture, parallel queries can be hard to manage, monitor and tune. Also, generating slave SQL for each DFO from the physical execution plan (comprising of row-source plus some parallel annotation) is difficult and error-prone, since the compilation structures get manipulated and transformed extensively after the high level SQL gets parsed, semantic-checked, optimized and compiled into the physical row-source plan.

As explained above, slave SQL is a means to generate the correct execution plan on the slave. To do this the database server has to add, parse and maintain special slave SQL constructs such as group-by staging operators, bitmap index specific operators, etc. Supporting slave SQL requires specialized slave-specific support from parsing all the way through execution. The amount of slave-specific support required to support the slave SQL approach results in a preponderance of slave specific code and has historically caused a large number of bugs. In addition, the new constructs required by slave SQL have to be SQL expressible.

As mentioned above, one step in the generation of the slave SQL statements that are sent to the slave sets is the unparsing of the row-source tree created for the original statement, and the data-flow operators contained therein. Such unparsing operations are difficult and error-prone. Typically, the database server has to generate a (supposedly implementation free) high level representation of the operations represented by each of the data flow operators. Within a relational database system that supports the SQL language, it is natural that the SQL language is used to express such high level representations of dataflow operators.

Thus, while the original statement is parsed to derive the query plan, portions of the query plan must be "un-parsed" to produce slave SQL statements. Unfortunately, by the time the database server reaches the post-compilation phase, when unparsing for slave SQL is performed, the compilation process has modified or moved around information (e.g. predicates) that needs to be gathered together again to correctly regenerate a query. This unparsing process is very specific to the parallel execution engine and requires statement-specific support, which can be cumbersome and error-prone.

In addition, using the slave SQL approach, parallelization of new SQL operations is usually done well after the design and implementation of the serial operation. Some of the decisions taken in the compilation layers for the serial implementation (which is based on the original statement) can contradict the requirements of generation and support for slave SQL.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques shall be described hereafter for executing queries, or portions thereof, in parallel without using slave SQL to communicate to each slave the operations to be performed by the slave. Instead of generating one cursor for the query coordinator (QC) based on the original statement, and separate cursors for each DFO based on the slave SQL, the techniques involve sharing the cursor that is generated from the original statement among the various participants involved in the parallel execution of the operations specified in the original statement. The model used by these techniques is referred to herein as the "Parallel Shared Cursor" (PSC) model of processing, in parallel, the operations specified in SQL queries.

The Parallel Shared-Cursor (PSC) based model provides a simpler and more manageable architecture for parallel SQL cursors. Specifically, in the PSC model, the database server builds a single cursor that contains the information needed for parallel execution, and is used for the entire parallel execution process, by both the QC and the slaves on a single instance of the database server where cursor sharing is possible. Because QC unparsing and slave parse support for slave SQL is no longer required, the support of new features, monitoring of query progression, and diagnosability of query performance, become better.

Example System

Figure 1:
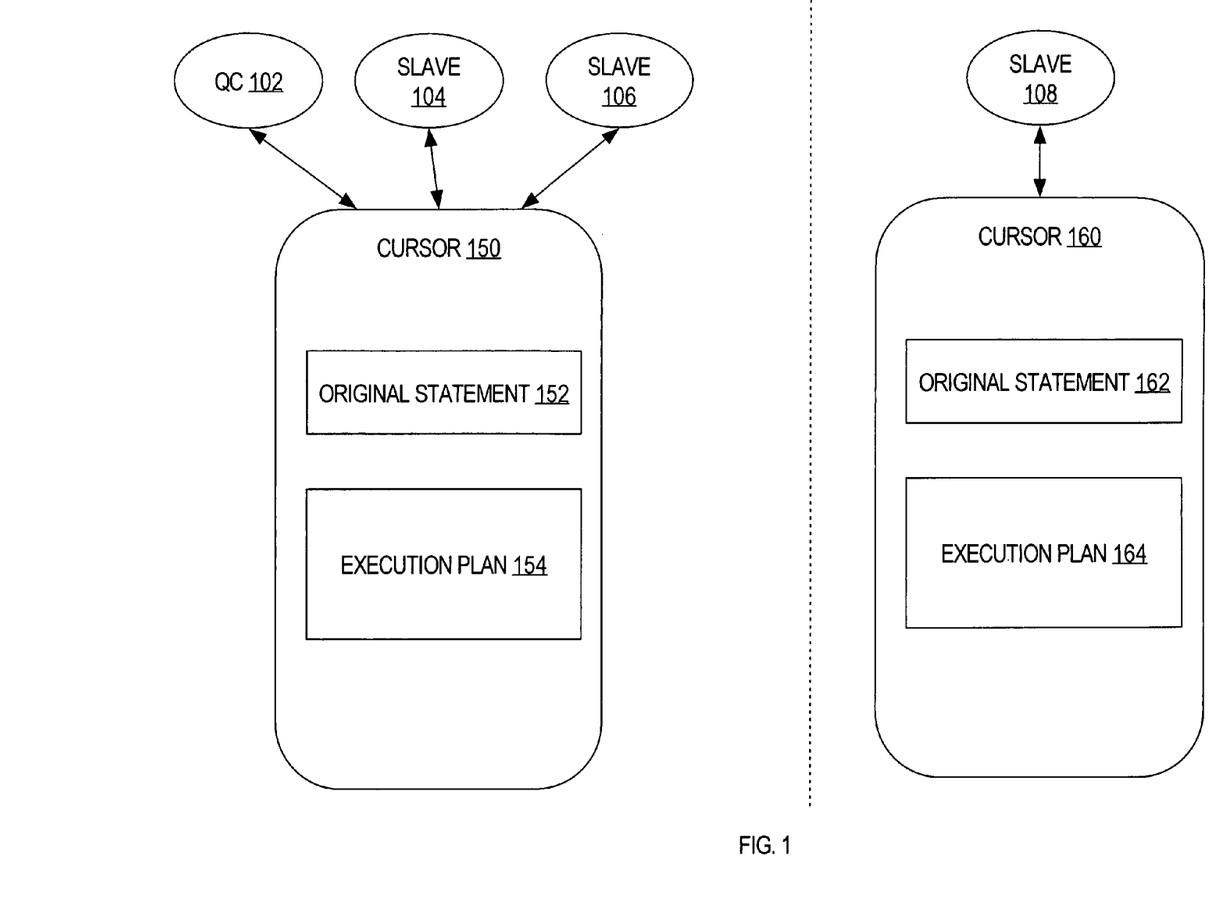
FIG. 1 is a block diagram illustrating a system in which slave processes perform work based on shared cursors and equivalent cursors, according to an embodiment of the invention.

FIG. 1 is a block diagram of a system in which a single cursor is shared between several processes, according to an embodiment of the invention. Specifically, a cursor 150 has been generated by a database server based on a database statement received from a database application. In the illustrated embodiment, the cursor 150 includes the original statement 152 of the database command (typically a SQL statement) for which the cursor 150 was generated. In addition, the cursor 150 includes an execution plan 154 that describes a plan for accomplishing all of the operations specified by the original statement 152 (herein referred to as the "complete execution plan").

For the purpose of explanation, it is assumed that the database statement specifies one or more operations that can be parallelized. Consequently, the cursor 150 containing the complete execution plan is made available to a query coordinator 102 to allow the query coordinator 102 to coordinate the parallel execution of those operations.

The query coordinator 102 coordinates the parallel execution of an operation by providing to slave processes information that causes each of the slave processes to perform a portion of the parallel operation. However, the information provided to the slave processes is not in the form of slave SQL that must be separately parsed and compiled by the slave processes. Rather, as illustrated in FIG. 1, the cursor 150 that contains the execution plan 154 used by the QC is made available to the slaves. Specifically, FIG. 1 illustrates a scenario in which two slaves 104 and 106 have access to the same instance of the cursor 150 that is being used by the query coordinator, and one slave 108 that has access to a separate instance of a cursor 160 which, as shall be explained in greater detail hereafter, is an equivalent of cursor 150.

Regardless of whether a slave has access to the same cursor instance as the query coordinator, or to an instance of an equivalent cursor, the slave is privy to the same information. Significantly, that information is already in compiled form, thus avoiding the need for each slave to separately parse and compile their own cursors based on SQL fragments. Further, the information thereby available to each slave includes the complete execution plan, and is not limited to the portion of the plan that is specific to the role of that particular slave in the execution of the plan. Because the slave is exposed to this information, the slave can make intelligent decisions with respect to how to execute its portion of the plan. For example, a slave may determine how it will execute its portion of the plan based, in part, on some characteristic of the original statement. As another example, a slave may determine how it will execute its portion of the plan based, in part, on portions of the execution plan that will be executed by other slave processes.

The Complete Execution Plan

According to one embodiment, because the slaves are to perform their assigned tasks based on the shared execution plan, all the constructs used for the execution of a parallel statement are expressed as row sources in the physical plan. Consequently, there need not be any other representation of this complete execution plan, and the same representation is used by the execution engine, both in the QC and the parallel execution slaves. Constructs that may be used to supplement an execution plan to provide support for execution of the parallel statement shall be described in detail hereafter.

During the compilation of the original SQL statement, the optimizer within the database server generates a logical execution plan in multiple passes. According to one embodiment, in the first pass, the join order and access methods are picked to minimize the parallel cost of a plan (analogous to total system usage cost) given the degree of parallelism (DOP) specified for each object in the query. While computing the parallel cost of a plan in this pass, the database server takes various parallel characteristics into account, such as number of nodes, number of partitions (table or index fragment) of each object, and the default distribution method.

In the second pass, the optimizer computes the best distribution method for each operation in the parallel plan. The result is a logical representation of the execution plan which is then compiled into a tree-based representation of physical operators (row-sources). In this phase, the database server also clumps row sources into DFO's and performs some physical optimizations taking into account specific knowledge of the requirement of the operator such as clustering, ordering or data fragmentation. The process of clumping row sources is typically performed while building the row source tree for the execution plan of the statement. Clumping generally involves grouping neighboring row sources to encapsulate or define a connected component of the plan tree which will be executed on a single slave process as a single piece. Clumping is used by the database server to define DFOs. When two neighboring row sources in the plan tree are not clumped together, they belong to different DFOs (i.e., there is a DFO boundary between them).

Figure 2:
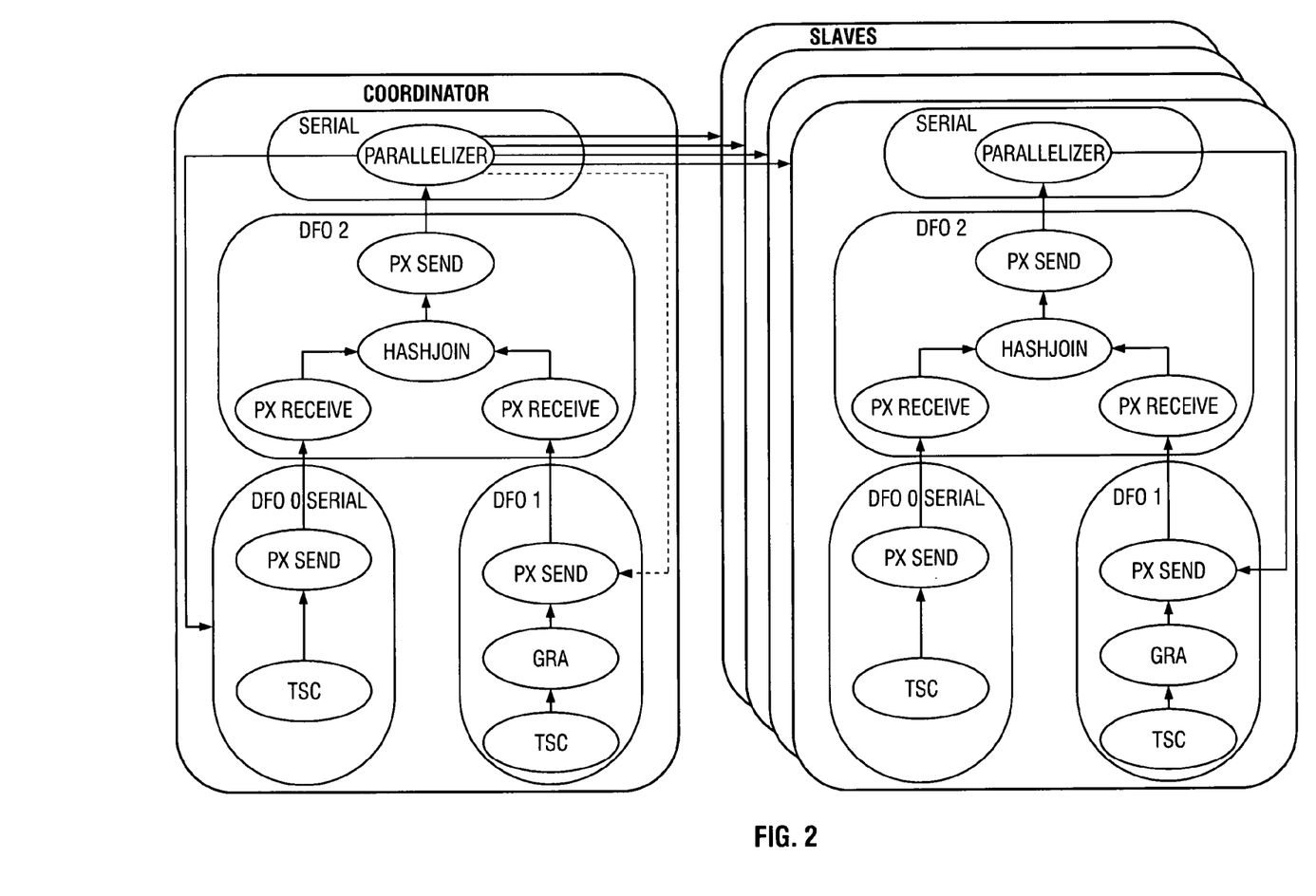
FIG. 2 is a block diagram illustrating slave processes that have access to an entire execution plan of a query, according to an embodiment of the invention.

FIG. 2 is a block diagram that illustrates the complete rowsource-based physical plan for a parallel hash-join with hash redistribution and a serial left-input as generated by the parallelization pass. Specifically, FIG. 2 shows the complete physical rowsource based plan corresponding to a parallel hash-join with left input serial (e.g. because it is too small to benefit from parallelism). The QC executes the Parallelizer row source and the serial left DFO (a serial scan). One set of slaves executes DFO1 (the parallel scan) and the other set of slaves executes DFO2 (the parallel hash-join). The PX-SEND and PX-RECEIVE row sources are added at DFO boundaries to implement the hash-redistribution Table Queue for rows fetched from the serial or parallel scan and sent to the parallel hash-join. As illustrated, the complete plan is provided to each of the slave processes that will participate in a part of the plan. Because each slave has access to the compiled plan, the need of an intermediate language for parallel subplans is avoided. Instead the QC and all slaves use the same parallel execution plan.

According to one embodiment, the plan is communicated by sharing the same physical copy of the plan when the slaves and QC run on the same node, and by linearizing and shipping the original SQL statement to remote nodes participating in the execution. On each remote node, the original statement is delinearized, reconstructed, and built into the cursor by one slave, and shared by all others on the same node. Alternatively, a separate copy of the complete execution plan my be sent to remote nodes by linearizing the plan into a predetermined format, for example.

Sharing the complete execution plan with the slave nodes improves the manageability and monitoring of parallel features in radical ways since all parallel constructs are expressed in the physical plan as row sources. Interesting parallel execution statistics (e.g. memory usage, number of messages, temp-space usage, network bandwidth, load skew) are all available in the row sources of the shared plan across all slaves and can be aggregated either live (for progress monitoring) or after a query finishes.

In addition, sharing the complete execution plan makes parallelization of new physical operators much easier and less error-prone, since the database server does not have to support an intermediate language on slaves, but only needs to define data distribution, clumping and DFO boundaries for the corresponding new row sources during plan compilation.

Further, sharing the complete execution plan improves code maintenance and debugging capability and reduces the memory usage associated with intermediate representations. Specifically, as discussed above, the QC and all slaves share or use the same parallel single cursor. At execution time, the QC only has to send control information to slaves to schedule the various DFOs (illustrated by the arrows in FIG. 2). Slaves scanning an object request and receive object fragment (granule) information via the granule iterator row source controlled by the QC (executing the parallelizer row source). Dynamic load balancing happens by the rate at which various slaves consume granules they receive from the QC and generate data to be sent to the consuming DFO.

Supplementing the Complete Plan

According to one embodiment, the compilation operation includes supplementing the execution plan with additional information to take into account that slave processes will be performing their specific tasks based on the plan. According to one embodiment, such additional information includes information that indicates how data produced by slaves should be redistributed, information that indicates how the operations should be ordered and scheduled, and information that indicates how base data should be horizontally partitioned.

According to one embodiment, this supplemental information is added to the complete plan by inserting certain specific row sources into appropriate locations within the plan. According to one embodiment, row sources inserted in this manner include a granule iterator row source, redistribution row sources, and slave-specific parallelizer row sources.

For the purpose of explaining the use of the new row sources, consider a database statement that selects all columns from a table foo, where the resulting rows are ordered by the values in column 1. A typical execution plan for such a statement would include a table scan row source (TSC) whose results are fed into an order-by row source (OBY). Diagrammatically, the row source tree could be represented as:

(TSC)->(OBY)

However, such a plan does not include the detail that would be required by a slave process. Specifically, in addition to the general operations that are to be performed, a slave process needs to know (1) how the table foo is to be partitioned for the purpose of parallelizing the table scan, and (2) how the slave processes that work on the table scan should re-distribute their results to slaves performing the parallel OBY.

According to one embodiment, such an execution plan is supplemented so that the table scan (TSC) is followed by a granule iterator (GRA) that indicates how the table scan operation is to be horizontally divided among the scan slaves. Because the results of the table scan are sent from one set of slaves (the TSC slaves) to another set of slaves (the OBY slaves), a "sender-side distribution" row source (PXSEND) is placed after the granule iterator, and a "receiver-side distribution" row source (PXRECV) is placed before the order by row source. Finally, a parallelizer row source (PX) is added to the top of the row source tree to denote that it controls the parallel execution and scheduling of the parallel (sub)tree below it. Thus, the resulting plan will be:

(TSC)->(GRA)->(PXSEND)->(PXRECV)->(OBY)-> (PX)

The Granule Iterator Row Source

In the present example, (GRA) encapsulates the horizontal portioning of a base object, such as an index, table, index-organized-table (IOT), or external table, for the purpose of distributing the data from the base object among multiple slaves. In the present example, (GRA) would represent the division of table foo for performing the parallel scan operation. According to one embodiment, the (GRA) row source includes logic for requesting a granule of work from the QC. Such requests may be sent to the QC by the slave process both to receive a first work granule to work on, and to receive additional work granules to work on after completing the work granule that the slave is currently working on.

Distribution Row Sources

The (PXSEND) and (PXRECV) row sources represent the distribution of data between sets of slave processes, or between the QC and a set of slave processes. Specifically, the (PXSEND) row source represents the sender-side boundary where redistribution is taking place, and includes information about how the senders should distribute the data they produce. In the present example, the (PXSEND) row source would indicate that the (TSC) slaves are to distribute the data they produce using range partitioning based on column 1.

The (PXRECV) row source represents the receiver-side boundary where redistribution takes place, and includes information about how receivers will obtain the data upon which they are to operate. In the present example, the (PXRECV) row source includes information that indicates to the (OBY) slaves how they are to receive the data upon which they will perform their portion of the order-by operation. Specifically, the (PXRECV) row source would indicate that the (OBY) slaves are to receive data from the set of (TSC) slaves.

The Parallelizer Row Source

The parallelizer row source (PX) represents the operation of scheduling performance of the operations required by the row sources that reside below the (PX) row source in the row source tree. Thus, (PX) is a row source representation of the operations performed by the query coordinator to coordinate execution of the other row sources in the execution plan. The PX row source is added either at the top of the plan, denoting the entire query, or it is added to denote a subtree which is to be executed in parallel, but whose parent is to be executed in serial. That is, a PX row source denotes a bottom parallel to serial transition in the execution semantics modeled by a query plan.

As mentioned above, slave queries are provided access to the complete plan, and not simply a representation of the portion of the plan that they are to execute themselves. Thus, each slave query works from an execution plan that includes the (PX) row source. However, if every slave process executed the (PX) row source in the same manner as the actual QC, then the entire execution plan would be executed once for the QC, and then once again for each slave process.

To prevent such results, the parallelizer row source used by each slave indicates to the slave the specific portion of the complete plan that is to be executed by the particular slave process. Thus, within a slave process, the (PX) row source continues to control the scheduling of the operations, but is only used for scheduling the specific portion of the row source tree that has been assigned to that specific slave process.

Determining Where to Insert Granule Iterator Row Sources

As mentioned above, the granule iterator row source contains the logic for horizontally partitioning a base object. Put another way, the granule iterator row source represents the way an object should be iterated over to execute a particular operation (i.e. "for each piece of this object, do . . . "). For parallel operations to be performed correctly, the correct partitioning logic must be included in the granule iterator row source.

According to one embodiment, all of the physical iterators (chunks, block range and partition) are consolidated into the unified "granule iterator". The granule iterator behaves differently depending on whether the execution context is QC or a slave process. In the QC execution context, the granule iterator includes logic for the QC to provide work granules to requesting slave processes, where the work granules are based on a horizontal partitioning of a base object. In the slave process execution context, the granule iterator causes a slave process to request work granules from the QC.

Granule iterators may be placed, for example, at the same location that partition iterators would otherwise appear. When a granule iterator replaces a partition iterator, some transformation may be required on the row source associated with the replaced partition iterator row source. For example, assume that a partition iterator row source is associated with a table scan row source, upon changing the partition iterator row source to a granule iterator row source, the corresponding scan operations may be translated from a full table scan into a rowid range scan. Under similar circumstances, an index fast full scan is translated into an index rowid range scan, etc.

Under some circumstances, it may be necessary to insert a granule iterator row source at a location where no partition iterator exists. For example, if a single partition is accessed and known at runtime, then the row source tree may contain no partition iterator. This situation is detected by testing whether the logic of the corresponding scan row source is limited to a single partition.

As another example, a row source tree may contain a nested partition iterator (e.g. one for the range dimension and one for the hash sub-dimension of a range-hash composite partitioned table). When accessing a composite table, the serial plan would contain two partition iterators, one for each dimension. In parallel, the two partition iterators are replaced by a single granule iterator. A granule iterator uses the absolute dimension, as of each of the serial partition iterators uses the logical dimension. According to one embodiment, the compilation process includes logic for detecting the nesting of partition iterators, and transforms them into the appropriate single granule iterator. When executed in serial, a granule iterator then iterates on the absolute dimension.

Determining Where to Insert Distribution Row Sources

During the compilation of a database statement, the row source tree of the execution plan is generated, typically in a bottom up fashion. A parallelized version of the execution plan involves identifying row sources that represent operations that can be parallelized, and generating DFOs for those operations. Once a parallelized version of an execution plan has been generated, the plan may be inspected to identify boundaries of DFOs. Distribution row sources are then inserted into the row source tree at the identified boundaries. Specifically, a (PXSEND) row source is inserted at the boundary between a DFO and the row source that consumes the output of the DFO. Similarly, a (PXRECV) row source is inserted at the boundary between a DFO and the row source the produces the data consumed by the DFO.

Buffering Data Between DFOS

When an execution plan contains an operation that is to be executed in parallel, the data consumed by the operation must be provided to the slave set assigned to the operation, and the slave set must provide their output to the one or more processes that will consume the output of the operation. Depending on the nature of the operations involved, the slave set may have to wait for the input data set to be completely generated prior to consuming any of the incoming data. Similarly, it may be necessary for the slave set to finish the entire operation before any of their output can be consumed. In any parallel execution model with a limited number of slave sets to assign to parallel operations in a query plan, buffering has to be implemented to allow a slave set to finish one operation (DFO) and start another.

According to one embodiment, during compilation of complete plan, constructs representing buffers are inserted between producer DFOs and consumer DFOs, for storing the data produced by the producers until conditions are such that the consumers may commence consuming the data. Based upon these constructs, slave processes involved in a parallel operation are informed as to the location of the data they are to consume, and/or the location at which to store the data that they produce.

External Expressions

In certain situations, slaves that are executing a portion of a DFO require information that is not included in the data that is consumed by the slaves. Such situations are created by the presence of external expressions. For example, consider the database statement:

SELECT*FROM T1, T2

WHERE T1.col1=T2.col2

The execution plan for this statement may call for a serial scan of table T1, and a parallel probe of an index that is built on T2.col2. In this example, the slaves assigned to probe of the index require the current value of T1.col1 in order to perform their probes. According to one embodiment, such external expressions are identified during compilation of the execution plan, and an indication of the external information required by a row source is stored in association with the row source.

During execution, when the QC is coordinating the execution of the DFO of a row source that requires external information, the QC uses the information in the row source to determine what external information is required, and ensures that the required information is provided to the slave processes that are executing the DFO. In the example given above, the index probe row source would include information that would inform the QC of the need to provide the slave processes that are performing the index probe with the current value of T1.col1.

Communicating the Complete Plan

When slaves are executing in the same database server as the QC, then the same instance of the complete plan may be accessed by both the QC and the local slaves. However, sharing the same instance of the complete plan is typically not feasible with slaves that reside in nodes (e.g. SMP machines) that are remote relative to the QC. According to one embodiment, the complete plan is communicated in some predetermined (e.g. linearized) format by sending the original statement to those remote nodes, and causing the original plan for the same statement to be re or de-constructed (e.g. delinearized) from the message, so as to create a separate instance of the same complete plan. Within a remote node, any number of slaves may share access to the instance of the complete plan that has been constructed, based on the original statement, for the node.

Verifying Correctness of Remote Instances of the Plan

Unfortunately, it is possible for a remote node to compile the original statement in a manner that produces a second instance of the execution plan that is sufficiently different from the first instance of the execution plan that use of the second instance would lead to errors. Therefore, according to one embodiment, the correctness of such remote instances is determined by (1) generating one or more signatures based on the contents of the instance of the complete plan that is used by the QC (the "local" instance), (2) generating one or more signatures based on the contents of each remote instance of the complete plan, and (3) comparing the signatures of the local instance against the signatures of each of the remote instances. If the signatures of the local instance do not match the signatures of any remote instance, then the remote instance is considered incorrect. Consequently, the slaves that would otherwise have used the incorrect remote instance of the execution plan do not participate in the execution of the query.

It is possible for some portions (e.g. serial subtrees in the plan) of a remote execution plan to differ from the corresponding portions of the local execution plan without affecting the correctness of the result. Therefore, according to one embodiment, the signatures are generated only on those portions of the execution plan that must match in order to ensure correctness of the operation.

Increasing the Chance of Matching Signatures

Certain information, such as the original statement and the values of any bind variables, are sent to slaves to ensure correct parsing and execution of the statement. However, this information does not guarantee that a remotely generated execution plan will be usable. It is inefficient to have remote execution plans generated merely to later determine that they and their corresponding slaves cannot be used. Therefore, according to one embodiment, additional information is sent to remote nodes, along with the original statement and the values of any bind variables, in order to increase the chances that the remotely generated instance of the execution plan will be sufficiently similar to the local plan. According to one embodiment, such additional information includes the parameter values used by the optimizer that generated the local plan, and the parameter values used in the session in which the original statement was received. By taking this information into account, the optimizer on the remote nodes are more likely to generate remote execution plans that can be used by remote slaves to correctly perform portions of the parallel operation.

Directing the Focus of Slave Processes

As explained above, each slave process has access to the complete execution plan, either through access to the originally generated execution plan, or through access to an equivalent execution plan. Because much of the execution plan is going to be performed by processes other than a single slave process, each slave process must be told which portion of the complete plan represents that task for that particular slave process to perform. Specifically, the execution of the complete execution plan must be intercepted in each slave, and the slave must be redirected to execute the appropriate DFO under the appropriate parallelizer. Consequently, scheduling is performed from inside the global cursor (the cursor that includes the complete execution plan) instead of being performed outside of multiple slave SQL cursors.

According to one embodiment, at the end of compilation of the global cursor, all the row sources necessary to the parallel execution (e.g. parallelizer, redistribution row sources like PXSend and PXRecv, granule iterator and buffers) are placed into the row source tree. In addition, to the extent that equivalent cursors were generated at remote nodes, the equivalent cursors were generated based on additional information, such as statistics and parameters, and the plan signature was used to check for equivalence. Further, parallel information (e.g. DFOs are linked in execution order for each slave set) has been prepared, and buffers have been allocated.

Query Monitoring

There are usually many possible ways for a database server to perform the operations required by a query. For a variety of reasons, it is important for a database administrator to be able to monitor queries to how the database is performing the queries. The ability to monitor the execution of a query is generally referred to as "Query Monitoring".

Query Monitoring has traditionally been a weak area for parallel queries. One of the key elements in making a complex feature like parallel queries more manageable and tunable is the ability to see and relate all the parallel activities. With the slave SQL parallel query (PQ) execution model, there is one QC cursor and n slave cursors being run. The only cursor known to the user is specifically the one that is not executed, the serial cursor. This is very confusing for an end-user. These multiple cursors make query monitoring a difficult prospect. For instance, a parallel partition maintenance operation is translated at the slave SQL level as a parallel Create Table As Select statement with possibly multiple input queries. To relate all these parallel cursors, the database administrator needs a profound understanding of the internal behavior of PQ. In contrast, the single-cursor based design substantially improves manageability of a parallel query and makes it similar to the serial execution model.

Statistics Gathering

Every time a query is executed, only one of the several possible ways to execute the query is used. It is possible that the selected way of performing the operations is not the optimal way. One way to test the performance level of the selected execution plan is to include in the database server a mechanism for monitoring and recording the performance statistics of query execution. This information may then be used to "tune" the database server for better future performance of the query.

Tuning and diagnostic support has traditionally been difficult when one or more operations required by the query are performed in parallel by slave processes. One of the key elements in making a query parallelization more manageable and tunable is the ability to provide aggregated statistics across a run of a query and across all the slaves. This fits in very closely to the overall goal of manageability.

The cursor is the basic repository for all the current and new statistics. When slave SQL is used as the mechanism to communicate to the slaves the specific tasks they are to perform, there is one QC cursor and n slave cursors being run. These multiple cursors make aggregated statistics computation a difficult prospect since they don't have the same shape.

In contrast, the parallel-shared cursor approach substantially improves manageability of a parallel query and makes it similar to the serial execution model. This way all the effort put into the serial statistics gathering can be reused. The database server is able to have a central repository for all parallel execution statistics on a cursor basis. Since the QC cursor has a one-to-one correspondence at the row-source level with the cursor executed in the slaves, row-sources can be used to contain aggregated values gathered for all the slaves. Thus, according to one embodiment, the database server provides an infrastructure to store, access and aggregate statistics across all the shared slave cursors.

Hardware Overview

Figure 3:
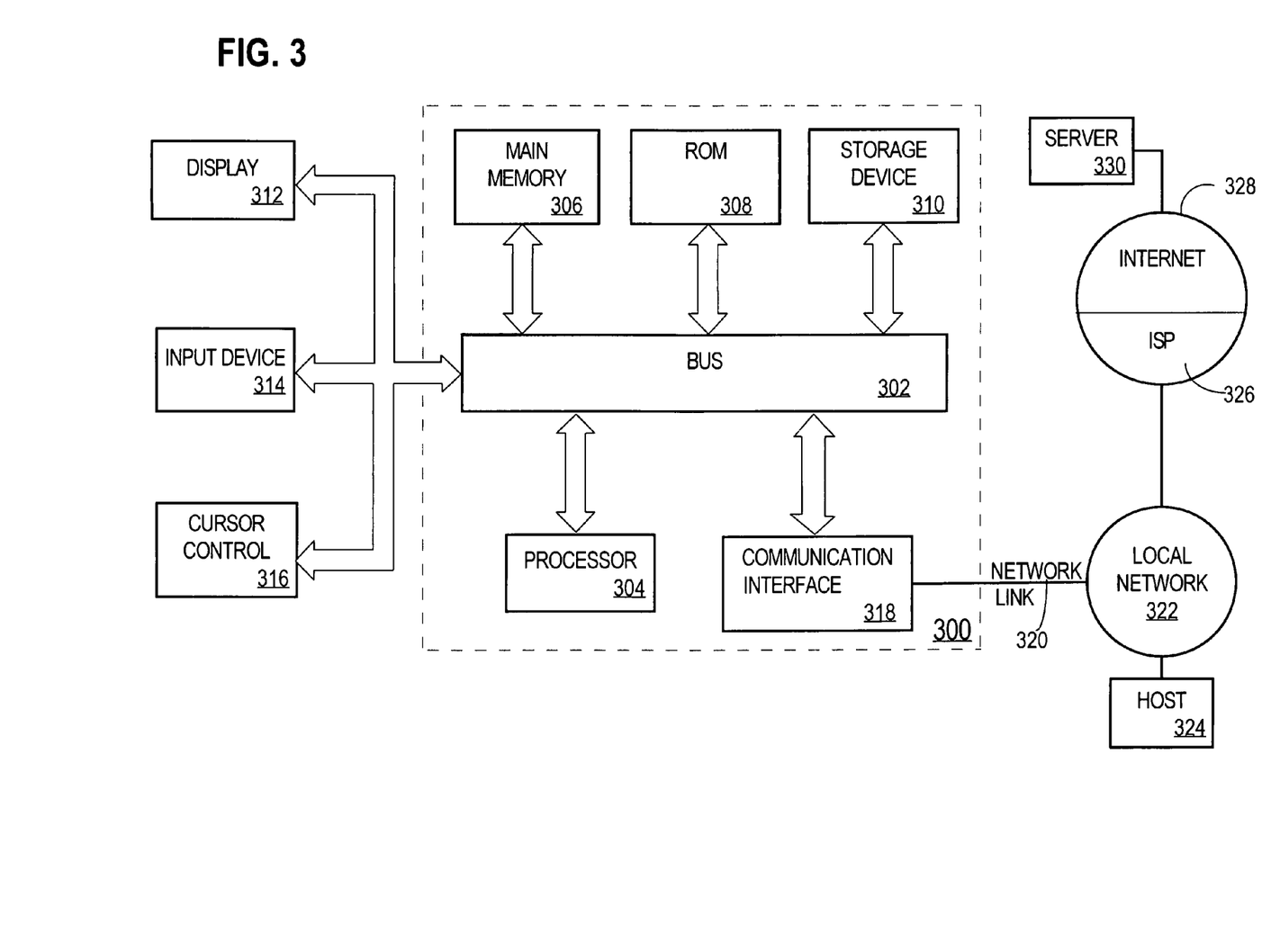
FIG. 3 is a block diagram illustrating a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for processing a database statement within a database server, the method comprising the steps of:
    receiving at the database server the database statement;
    determining that at least one operation required by the database statement can be parallelized;
    within the database server, generating a set of information about how to execute the database statement;
    causing a plurality of slave processes to perform said at least one operation by sharing the set of information with each slave process of said plurality of slave processes, wherein the set of information shared with each slave process includes (a) information about a task to be performed by said slave process, and (b) information about one or more tasks, to be performed by processes other than the slave process, to execute the database statement; and sending to each slave process of said plurality of slave processes data that indicates which part of the set of information shared with the slave process represents the part of the at least one operation that should be performed by the slave process.

2. The method of claim 1 wherein:

the step of sharing the set of information includes sharing an execution plan for the database statement; and sharing the execution plan with a particular slave process of the plurality of slave processes is performed by:
  providing an original statement of the database statement to a node on which the particular slave process resides, wherein the original statement is the form of the database statement in which the database statement was received by the database server;
  at said node, generating an equivalent execution plan based on the original statement; and
  the particular slave process accessing the equivalent execution plan.

3. The method of claim 2 wherein:

further comprising the step of providing to the node additional information that includes at least one of (a) values associated with session parameters of a database session in which the database statement was received, and (b) values associated with optimizer parameters that were used by an optimizer to generate a plan for the database statement in a node other than said node; and the step of generating an equivalent execution plan is performed based, at least in part, on the additional information.

4. The method of claim 1 wherein:

the step of generating a set of information includes generating an execution plan for the database statement, wherein the set of information includes the execution plan; and the step of sending to each slave process of said plurality of slave processes data that indicates which part of the at least one operation should be performed by the slave process includes sending to each slave process data that indicates a specific portion of the execution plan that is to be performed by the slave process.

5. The method of claim 4 wherein:

the step of sending to each slave process data that indicates a specific portion of the execution plan that is to be performed by the slave process includes sending to a particular slave process data that indicates a particular portion of the execution plan that is to be performed by the particular process; and the method further includes the step of the particular slave process determining how to execute the particular portion based, at least in part, on characteristics of the execution plan other than the particular portion of the plan that is to be executed by the particular slave process.

6. The method of claim 1 wherein:

the step of generating a set of information includes generating an execution plan for the database statement;

constructing a shared cursor for the database statement, wherein the shared cursor provides access to the execution plan; and the step of sharing access includes providing each slave process of said plurality of slave processes access to the shared cursor.

7. The method of claim 6 wherein the step of providing each slave process of said plurality of slave processes access to the shared cursor includes allowing two or more of said slave processes to access a shared instance of the shared cursor.

8. The method of claim 6 wherein the step of providing each slave process of said plurality of slave processes access to the shared cursor includes allowing one of the slave processes to access a first instance of the shared cursor, and allowing another one of the slave processes to access a second instance of the shared cursor.

9. The method of claim 8 wherein:

the one slave process resides on a first node;

the other slave process resides on a second node; and the first node is a different node than said second node.

10. The method of claim 9 wherein:

a first plurality of slave processes on said first node share access to said first instance of said shared cursor; and a second plurality of slave processes on said second node share access to said second instance of said shared cursor.

11. The method of claim 1 wherein:

the step of generating a set of information includes generating an execution plan for the database statement, wherein the set of information includes the execution plan; and the method further comprises the step of inserting into the execution plan a granule iterator row source that encapsulates a horizontal partitioning of a base object upon which the database statement operates.

12. The method of claim 1 wherein:

the step of generating a set of information includes generating an execution plan for the database statement, wherein the set of information includes the execution plan; and the method further comprises the step of inserting into the execution plan at least one distribution row source that specifies how data is to be redistributed between one of
  a first slave set and a query coordinator; and
  a first slave set and a second slave set.

13. The method of claim 12 wherein the step of inserting into the execution plan at least one distribution row source includes:

inserting into the execution plan at least one sender-side distribution row source that indicates how sending processes are to distribute data that the sending processes produce; and inserting into the execution plan at least one receiver-side distribution row source that indicates how receiving processes are to obtain data that the receiving processes are to consume.

14. The method of claim 1 wherein:

the step of generating a set of information includes generating an execution plan for the database statement, wherein the set of information includes the execution plan; and the method further comprises the step of inserting into the execution plan a parallelizer row source that encapsulates the scheduling of tasks that slave processes are to perform.

15. A non-transitory computer-readable storage medium storing one or more sequences of instructions which, when executed by one or more processors, cause the one or more processors to perform the method recited in claim 1.

16. A non-transitory computer-readable storage medium storing one or more sequences of instructions which, when executed by one or more processors, cause the one or more processors to perform the method recited in claim 2.

17. A non-transitory computer-readable storage medium storing one or more sequences of instructions which, when executed by one or more processors, cause the one or more processors to perform the method recited in claim 3.

18. A non-transitory computer-readable storage medium storing one or more sequences of instructions which, when executed by one or more processors, cause the one or more processors to perform the method recited in claim 4.

19. A non-transitory computer-readable storage medium storing one or more sequences of instructions which, when executed by one or more processors, cause the one or more processors to perform the method recited in claim 5.

20. A non-transitory computer-readable storage medium storing one or more sequences of instructions which, when executed by one or more processors, cause the one or more processors to perform the method recited in claim 6.

21. A non-transitory computer-readable storage medium storing one or more sequences of instructions which, when executed by one or more processors, cause the one or more processors to perform the method recited in claim 7.

22. A non-transitory computer-readable storage medium storing one or more sequences of instructions which, when executed by one or more processors, cause the one or more processors to perform the method recited in claim 8.

23. A non-transitory computer-readable storage medium storing one or more sequences of instructions which, when executed by one or more processors, cause the one or more processors to perform the method recited in claim 9.

24. A non-transitory computer-readable storage medium storing one or more sequences of instructions which, when executed by one or more processors, cause the one or more processors to perform the method recited in claim 10.

25. A non-transitory computer-readable storage medium storing one or more sequences of instructions which, when executed by one or more processors, cause the one or more processors to perform the method recited in claim 11.

26. A non-transitory computer-readable storage medium storing one or more sequences of instructions which, when executed by one or more processors, cause the one or more processors to perform the method recited in claim 12.

27. A non-transitory computer-readable storage medium storing one or more sequences of instructions which, when executed by one or more processors, cause the one or more processors to perform the method recited in claim 13.

28. A non-transitory computer-readable storage medium storing one or more sequences of instructions which, when executed by one or more processors, cause the one or more processors to perform the method recited in claim 14.

* * * * *

UNITED STATES PATENT AND TRADEMARK OFFICE
CERTIFICATE OF CORRECTION

PATENT NO. : 8,086,645 B2 Page 1 of 1
APPLICATION NO. : 10/824887
DATED : December 27, 2011
INVENTOR(S) : Ghosh et al.

It is certified that error appears in the above-identified patent and that said Letters Patent is hereby corrected as shown below:

In column 15, line 11-13, In Claim 2, delete "2. The method of claim 1 wherein:
the step of sharing the set of information includes sharing an
execution plan for the database statement; and" and
insert -- 2. The method of claim 1 wherein the step of sharing the set of
information includes:
sharing an execution plan for the database statement; and --,
therefor.

Signed and Sealed this
Third Day of April, 2012

David J. Kappos
*Director of the United States Patent and Trademark Office*